E. R. WHITNEY.
Car Coupling.
No. 79,283.
Patented June 23, 1868.
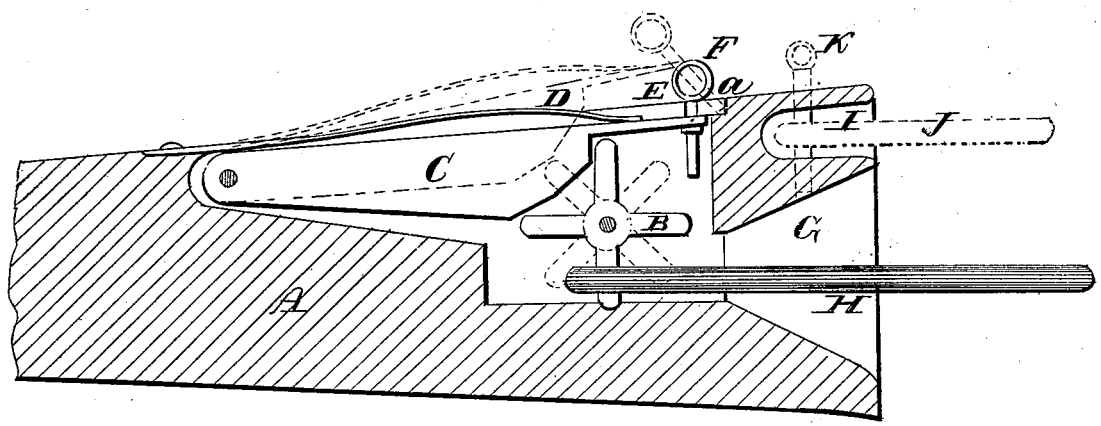
Witnesses.
Inventor.

United States Patent Office.

E. R. WHITNEY, OF PLATTSBURG, NEW YORK.

Letters Patent No. 79,283, dated June 23, 1868.

---

IMPROVED CAR-COUPLING.

---

The Schedule referred to in these Letters Patent and making part of the same.

---

TO ALL WHOM IT MAY CONCERN:

Be it known that I, E. R. WHITNEY, of Plattsburg, in the county of Clinton, and in the State of New York, have invented certain new and useful Improvements in Car-Coupling; and do hereby declare that the following is a full, clear, and exact description thereof, reference being had to the accompanying drawings, and to the letters of reference marked thereon.

The nature of my invention consists in a four-armed revolving cross or wheel, which, in combination with a dog or lever, held with a spring in the top of a coupling-box, forms a self-set and self-acting coupling.

To enable others skilled in the art to make and use my invention, I will proceed to describe its construction and operation.

In the annexed drawings, forming part of this specification, A represents a coupling-box, made of ordinary or suitable material. B is a four-armed cross, mounted on an arbor, having its bearings in the sides of the box A. The cross revolves on or with the arbor. C represents a dog or lever, pivoted in the rear end of the coupling-box, and held down in its place by the spring D. E is a pawl, pivoted in a tongue extending from the dog C, and has a handle, F.

By raising the handle F, and placing the pawl E in the notch $a$, the wheel B is free to revolve either way. G is the entrance to the self-coupling, and H the coupler. I is the upper chamber, for coupling with common coupler J, the pin K holding the coupler in its place.

When the coupler H enters the chamber G, it strikes the lower vertical arm of the cross B, moving it back, the rear horizontal arm lifting the dog or lever C, until the rear horizontal arm becomes the upper vertical arm, when the lever C falls down, locking the wheel. The lower vertical arm thus becomes the rear horizontal arm, and the front horizontal arm drops into the coupler H, and becomes the bottom vertical arm.

When it is desired to uncouple the cars, raise the handle F, and place the pawl E in the notch $a$, when the cross or wheel B becomes free to revolve either way.

Having thus fully described my invention, what I claim as new, and desire to secure by Letters Patent, is—

The arrangement of a four-armed cross or wheel B, dog or lever C, with spring D, pawl E, handle F, and notch $a$, all made and arranged in the coupling-box A, and operating substantially as and for the purposes above set forth.

In testimony that I claim the foregoing, I have hereunto set my hand and seal, this 16th day of April, 1868.

E. R. WHITNEY. [L. S.]

Witnesses:
D. S. McMASTERS,
DAVID F. DOBIE,
JOSEPH FRAZIER.